(12) United States Patent
Huettner et al.

(10) Patent No.: US 8,448,774 B2
(45) Date of Patent: May 28, 2013

(54) APPARATUS AND METHOD FOR FORMING PIECE GOODS BATCHES

(75) Inventors: Johann Huettner, Mallersdorf (DE); Martin Seger, Neumarkt (DE)

(73) Assignee: Krones AG (DE)

( * ) Notice: Subject to any disclaimer, the term of this patent is extended or adjusted under 35 U.S.C. 154(b) by 238 days.

(21) Appl. No.: 12/538,479

(22) Filed: Aug. 10, 2009

(65) Prior Publication Data

US 2010/0038207 A1  Feb. 18, 2010

(30) Foreign Application Priority Data

Aug. 11, 2008 (DE) .......................... 10 2008 037 188

(51) Int. Cl.
*B65G 37/00* (2006.01)

(52) U.S. Cl.
USPC ......... 198/347.1; 198/367; 198/817; 198/415

(58) Field of Classification Search
None
See application file for complete search history.

(56) References Cited

U.S. PATENT DOCUMENTS

| | | | | |
|---|---|---|---|---|
| 4,262,792 | A * | 4/1981 | Davies ........................... | 198/348 |
| 4,281,756 | A * | 8/1981 | Bruno ......................... | 198/369.2 |
| 5,634,551 | A * | 6/1997 | Francioni et al. .......... | 198/460.1 |
| 6,308,817 | B1 * | 10/2001 | Corniani et al. ........... | 198/419.3 |
| 6,742,648 | B2 * | 6/2004 | Honegger ................... | 198/687.1 |
| 6,843,172 | B2 * | 1/2005 | Polloni et al. ................... | 101/35 |
| 7,341,141 | B2 | 3/2008 | Spatafora | |
| 7,518,079 | B2 | 4/2009 | Spangenberg Hansen et al. | |
| 2002/0125107 | A1 | 9/2002 | Horton et al. | |
| 2003/0146068 | A1 | 8/2003 | Polloni et al. | |
| 2006/0280592 | A1 | 12/2006 | Spatafora | |
| 2007/0262001 | A1 | 11/2007 | Hansen et al. | |

FOREIGN PATENT DOCUMENTS

| | | |
|---|---|---|
| CN | 1441741 | 9/2003 |
| DE | 10320321 A1 | 12/2004 |
| DE | 202004012848 U1 | 3/2005 |
| DE | 102005063193 A1 | 7/2007 |
| EP | 1721844 | 11/2006 |
| FR | 2745804 | 9/1997 |
| JP | 2270716 | 11/1990 |
| WO | 2004096455 | 11/2004 |
| WO | 2007123401 | 11/2007 |

OTHER PUBLICATIONS

Office Action issued by Chinese Patent office on Sep. 24, 2012 for corresponding Chinese Patent Application No. 2009101654810.
Search Report issued on Mar. 28, 2012 in corresponding European Patent Application No. 09166229.6.

* cited by examiner

*Primary Examiner* — Kavel Singh
(74) *Attorney, Agent, or Firm* — Onello & Mello, LLP

(57) ABSTRACT

An apparatus for forming piece goods batches, comprising a first transport device which transports the piece goods along a predefined transport path at a first transport speed, a second transport device which transports the piece goods along the predefined transport path at a second transport speed and which is arranged downstream of the first transport device along the transport path, and an assembling device which is arranged downstream of the second transport device along the transport path and forms batches from a plurality of piece goods. The apparatus may further comprise a buffer device which transports the piece goods along a variable buffer section and which is arranged between the first transport device and the second transport device, wherein the first transport speed and the second transport speed differ at least at times and the buffer device at least at times receives the piece goods streams brought about as a result of different speeds.

19 Claims, 2 Drawing Sheets

APPARATUS AND METHOD FOR FORMING PIECE GOODS BATCHES

RELATED APPLICATIONS

This application relies for priority upon German Patent Application No. 10 2008 037 188.2, filed on Aug. 11, 2008, the contents of which are herein incorporated by reference in their entirety.

BACKGROUND OF THE INVENTION

The present invention relates to an apparatus and a method for forming piece goods batches. The present invention will be described here with reference to containers for beverages and in particular so-called "pouches", i.e. deformable containers for beverages, such as juice cartons for example. However, the invention can also be applied to other piece goods batches and in particular to containers.

A wide range of conventional apparatuses for forming such piece goods batches are known from the prior art. It is known for example to supply the piece goods in a row to a transverse pushing mechanism which then pushes these rows transversely to the transport direction and in this way forms piece goods batches which comprise a plurality of rows of piece goods arranged next to one another. These batches can be separated for example from other piece goods batches by means of intermediate layers. It is known that the conveyor belts which supply the piece goods to the transverse pushing mechanism operate in a discontinuous mode and possibly are even stationary at times.

SUMMARY OF THE INVENTION

An object of the present invention is to provide an apparatus and a method for forming piece goods batches, and in particular, an apparatus and method for forming piece goods batches having an improved and continuous mode of operation for forming piece goods batches.

This is achieved according to embodiments of the invention described herein, and in particular, by an apparatus according to claim 1 and a method according to claim 15. Advantageous embodiments and further developments form the subject matter of the dependent claims.

In one embodiment, an apparatus according to the invention for forming piece goods batches comprises a first transport device which transports the piece goods along a predefined transport path at a first transport speed. Also provided is a second transport device which transports the piece goods along a predefined transport path at a second transport speed and which is arranged downstream of the first transport device along the transport path, and an assembling device which is arranged downstream of the second transport device along the transport path and forms batches from a plurality of piece goods.

The apparatus can comprises a buffer device which transports the piece goods along a variable buffer section and which is arranged between the first transport device and the second transport device on the transport path of the piece goods, wherein the first transport speed and the second transport speed differ at least at times and the buffer device at least at times receives piece goods streams or piece goods brought about as a result of different speeds.

The transport devices may be any devices which move or transport the piece goods along the transport path. Preferably, the transport devices are at least partially conveyor belts or conveyor chains or transport devices which do not guide the piece goods individually.

Conventional buffer devices are known from the prior art and usually serve to maintain operation of the apparatus when faults occur. For example, a conventional buffer device is emptied in the event of a fault or is filled with piece goods. In the context of the present invention, it is proposed to deliberately use the buffer device to compensate, by virtue of said buffer device, for differences in the transport speed which deliberately occur in order to form the piece goods batches.

Accordingly, each buffer device is thus used in the normal operating mode and/or a fault mode. Therefore, embodiments of the invention also relate to the use of a buffer device for an apparatus for forming piece goods batches. It is also possible to connect directly next to the outlet of the buffer device a device for depositing piece goods, and in particular flexible packages in a positionally accurate manner. The device here may be the abovementioned second transport device, which is embodied for example in the form of a transporter driven by a servo motor. If the piece goods arrive in one row, for example, the subsequent transport device or the subsequent servo drive is positioned in such a way that an exact single-row depositing takes place according to a packaging scheme. However, it would also be possible to guide the piece goods in multiple rows by means of said transport devices.

Preferably, therefore, the first transport speed and the second transport speed differ from one another at least at times in the regular operating mode. In particular, the second transport speed is preferably not a continuous speed but rather it is possible that the second transport device transports the piece goods intermittently in some sections and between these sections there are rest phases in terms of transport. In this embodiment, it is then proposed to use the buffer device not in the event of faults as in the prior art, but rather in the regular operating mode. In addition, it is also possible to use the buffer device when faults occur.

In a further advantageous embodiment, the second transport speed is at times greater than the first transport speed and is at times lower than the first transport speed. In the time portions in which the second transport speed is greater than the first transport speed, it is once again possible to empty the buffer device, whereas by contrast in those phases in which the second transport speed is lower than the first transport speed, the buffer device is refilled with the piece goods, it also being possible for the transport speed to be zero here. A filling and emptying of the buffer device preferably takes place periodically.

In a further advantageous embodiment, the buffer device is preferably displaceable along a transport section of the first transport device, and in another advantageous embodiment the buffer device is also displaceable along a transport section of the second transport device. In this way, by virtue of a displacement of this buffer device along the transport section, overall the transport section for the piece goods can be lengthened or shortened and thus more or less piece goods can be received in the buffer device or by the buffer device. Said transport sections are thus part of both the respective transport devices and the buffer device. The two aforementioned transport sections are preferably parallel to one another, and the piece goods are advantageously transported thereon in opposite directions.

In a further advantageous embodiment, a further transport device is arranged between the second transport device and the assembling device, which further transport device preferably forms part of the assembling device. In this case, preferably the level of the second transport device is higher than that of the further transport device. This means that the piece goods can easily be transferred from the second transport device onto the further transport device. Preferably the piece goods are transported in the same transport direction by a second transport device and the further transport device.

In a further advantageous embodiment, the further transport device has spacer devices which produce constant distances between the piece goods. These constant portions are transferred onto the assembling device and then are displaced in their entirety for example by means of a transverse pushing mechanism. The assembling device therefore preferably comprises a displacement device which displaces groups of piece goods in a direction differing from a transport direction. This displacement device preferably displaces the groups of piece goods, which are preferably arranged at precisely defined distances from one another, perpendicular to the transport direction. However, it would also be possible, depending on the particular application, to produce different distances between the piece goods.

In a further advantageous embodiment, the assembling device comprises at least two conveyor belts which are or can be driven independently of one another. The first conveyor belt serves for the inward transport of the piece goods, and the piece goods are transferred onto a further conveyor belt by means of the displacement device. Once a complete batch has been formed, said batch can be transported onward by all the conveyor belts.

In a further advantageous embodiment, the assembling device comprises a displacement device which displaces groups of piece goods in a direction perpendicular to a transport direction of the further transport device that is arranged after the second transport device Preferably, the buffer device comprises a displaceable carriage. By displacing the carriage, the transport paths are lengthened or shortened as explained above. Preferably, the carriage is moved back and forth periodically. The movement is periodic in particular in the regular operating mode.

In a further advantageous embodiment, the apparatus comprises a distance sensing device which is arranged upstream of the buffer device along the transport path and which senses distances between the piece goods. In this way it is possible to determine whether sufficient distances already exist between the individual piece goods and these distances can be determined more precisely.

Preferably, the distance sensing device is an optical distance sensing device, for example a device comprising one or more light barriers, wherein these light barriers may be offset with respect to one another or the respective beam paths may also intersect one another.

Preferably, the apparatus comprises a position sensing device which is arranged downstream of the buffer device along the transport path and which senses positions of the piece goods, in particular relative to the second or the further transport device. In reaction to output signals of the position sensing device, the second transport device and the further transport device can be controlled in such a way that the piece goods arrive on the assembling device or the conveyor belt thereof in a predefined manner.

Embodiments of the present invention also relate to methods for forming piece goods batches, wherein the piece goods are transported by a first transport device along a predefined transport path at a first transport speed and are transported by a second transport device along the predefined transport path at a second transport speed, said second transport device being arranged downstream of the first transport device along the transport path, and wherein piece goods batches are formed from a plurality of piece goods by an assembling device which is arranged downstream of the second transport device along the transport path.

The piece goods can be transported along a variable buffer section by a buffer device which is arranged between the first transport device and the second transport device, wherein the first transport speed and the second transport speed differ at least at times and the buffer device at least at times receives the piece goods streams brought about as a result of different transport speeds. Preferably, the buffer device at times receives said piece goods streams and at times discharges these piece goods.

In one preferred method, the buffer device or a part thereof is displaced along the transport path. In this case, the buffer device may be embodied for example as a dynamic adjusting carriage.

A laterally arranged row pushing mechanism is preferably provided which, as mentioned above, multiplies the deposited rows so that a robot arm can then lift the piece goods or pouches in layers. Via the buffer device, the respective transport devices or machines are decoupled and in this way a variable distance can be set between the piece goods. The transport movement of the second transport device is preferably stopped at least intermittently. The transport movement is preferably stopped in order to assemble rows of piece goods by means of the assembling device.

In one preferred method, a buffer device or a part thereof buffers a plurality of the piece goods at the buffer device as a result of the intermittent stoppage of the second transport device.

In one preferred method, the buffering of the plurality of the piece goods occurs during a regular operating mode In one preferred method, a buffer device or a part thereof buffers a plurality of the piece goods at the buffer device as a result of a difference between the first transport speed and the second transport speed.

BRIEF DESCRIPTION OF THE DRAWINGS

The foregoing and other objects, features and advantages of the embodiments of the invention will be apparent from the more particular description of advantageous embodiments of the invention. Further advantageous embodiments will emerge from the appended drawings.

In the drawings.

DETAILED DESCRIPTION OF EMBODIMENTS

Figure 1:
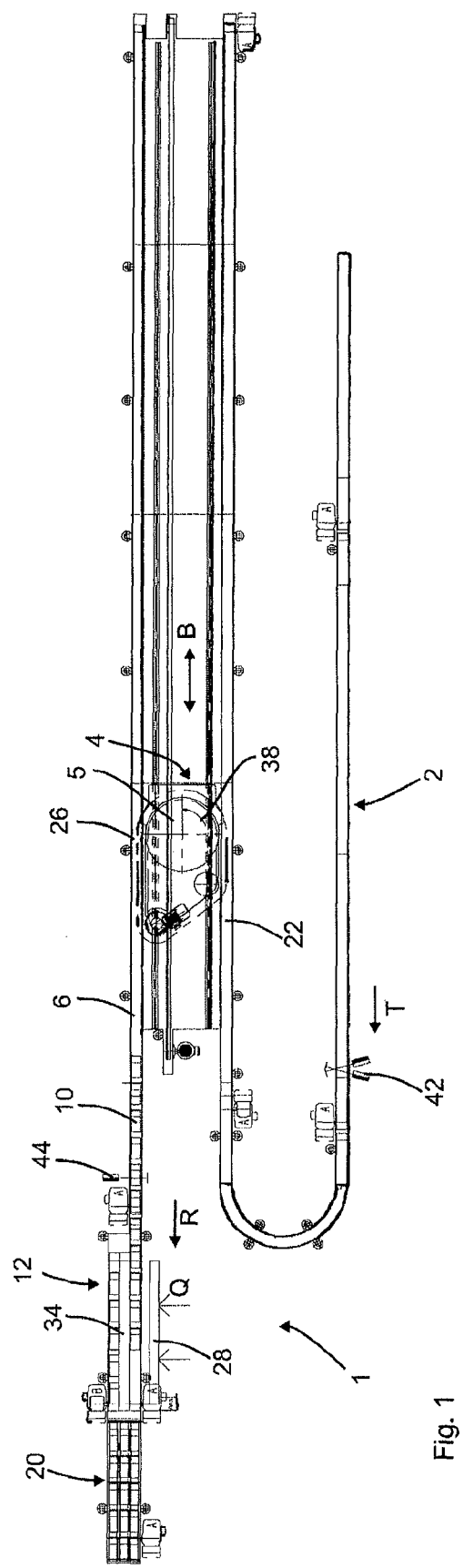
FIG. 1 shows a schematic view of an apparatus according to an embodiment of the invention.

FIG. 1 shows an apparatus 1 according to an embodiment of the invention for forming piece goods batches 20. This apparatus 1 comprises a first transport device 2 which guides the piece goods 10 along a transport path T. This first transport device 2 guides the piece goods 10 in the direction of a first transport section 22. The first transport section 22 forms part of a buffer device 4. In the embodiment shown in FIG. 1, the buffer device 4 comprises a deflecting unit 5 which transfers the containers 10 from the first transport section 22 to a second transport section 26, which forms part of a second transport device 6.

The first transport section 22 and the second transport section 26 are at the same height level. One example of such a buffer device is described, for example, in DE 20 2004 012 848 U1 by the applicant, herein incorporated by reference in its entirety. The second transport device 6, which likewise guides the containers 10 along a transport path T, is in turn adjoined by an assembling device 12 which forms piece goods batches 20 from the rows of piece goods 10. The assembling device 12 comprises a lower conveyor belt 32 which serves to be able to transport the piece goods 10 at a predefined distance from one another.

The buffer device 4, or in particular the deflecting unit 5, is movable on a carriage 38 in a displacement direction B of the carriage 38. Depending on the position of the buffer device 4 relative to the first and second transport sections 22 and 26, the transport section as a whole for the piece goods is thus lengthened or shortened. Since, as mentioned above, the first and second transport devices 2 and 6 at times convey the piece goods 10 at different speeds, the difference in speed can be compensated by virtue of a displacement of the buffer device 4.

Further, FIG. 1 shows a distance sensing device 42, in the form of two crossed light barriers, which measures a distance between the individual piece goods 10. By means of the buffer device 4, the distances between the piece goods 10 can also be increased as desired. However, it is also possible to increase the distance between these piece goods 10 at the transition between the second transport devices 6 and the lower conveyor belt 32 of the assembling device 12 (cf. FIG. 4). Alternatively, the distance between the piece goods 10 can be decreased. It would also be possible to construct the first transport device 2 in multiple parts, so as to provide a plurality of transport devices which may optionally also be able to be controlled independently of one another.

FIG. 1 further shows a position sensing device 44, which checks the position of the individual piece goods 10 on the second transport device 6. Depending on the positions thus determined, the second transport device 6 and the lower conveyor belt 32 of the assembling device 12 can be synchronised with one another so that the piece goods 10 are transferred correctly from the second transport device 6 to the to the lower conveyor belt 32. It can be seen in FIG. 3 that the level of the second transport device 6 is slightly higher than that of the level of the lower conveyor belt 32.

Figure 2:
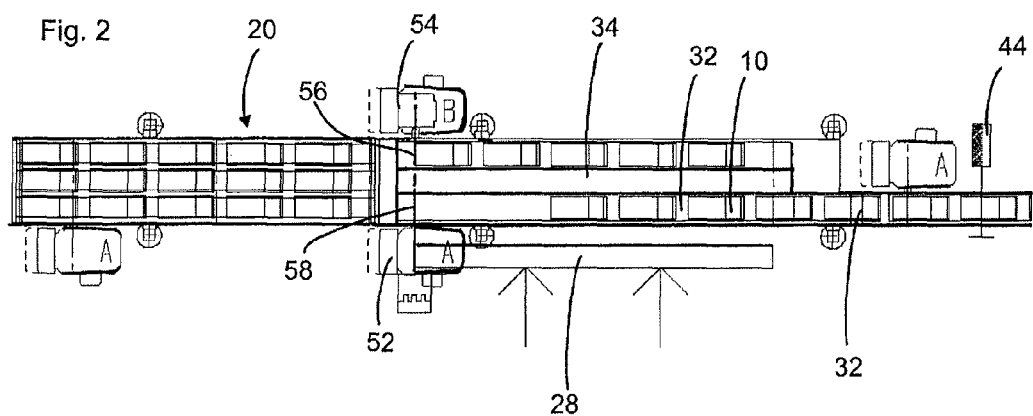
FIG. 2 shows a detailed view of the assembling device of FIG. 1.

FIG. 2 shows an assembling device 12 in a first embodiment. Here, the assembling device 12 comprises two transport devices or conveyor belts 32 and 34 which can be driven separately from one another, and which run parallel to one another. The upper conveyor belt 34 is broader than the lower conveyor belt 32, and is able to receive two rows of piece goods 10. However, it would also be conceivable for the conveyor belt to receive more or less than two rows of piece goods 10. Instead of a conveyor belt, conveyor chains and the like could also be provided here.

As shown in FIG. 2, the lower conveyor belt 32 extends further to the right than the upper conveyor belt 34. The piece goods 10 are supplied to this lower conveyor belt 32 at predefined distances from one another. As soon as one row of for example six piece goods 10 is present, a displacement device 28 is actuated which conveys this row onto the upper conveyor belt 34 or one of the two lanes of the upper conveyor belt 34. Once this has taken place, a further group of piece goods 10 can be supplied, and likewise conveyed onto the upper conveyor belt 34.

The displacement device 28 preferably has a comb-like structure, wherein spacer devices 18 can pass through gaps in this comb-like structure. However, it would also be conceivable that the spacer devices 18 are pivotable and yield under the movement of the displacement device 28.

As soon as the lower and upper conveyor belts 32 and 34 are completely filled with piece goods 10, the complete piece goods batch can be transported away to the left in FIG. 2. For this onward transport, two drive devices 52 and 54 for the lower and upper conveyor belts 32 and 34 are operated in parallel and in synchronism with one another. References 56 and 58 denote shafts for the conveyor belts.

Figure 3:
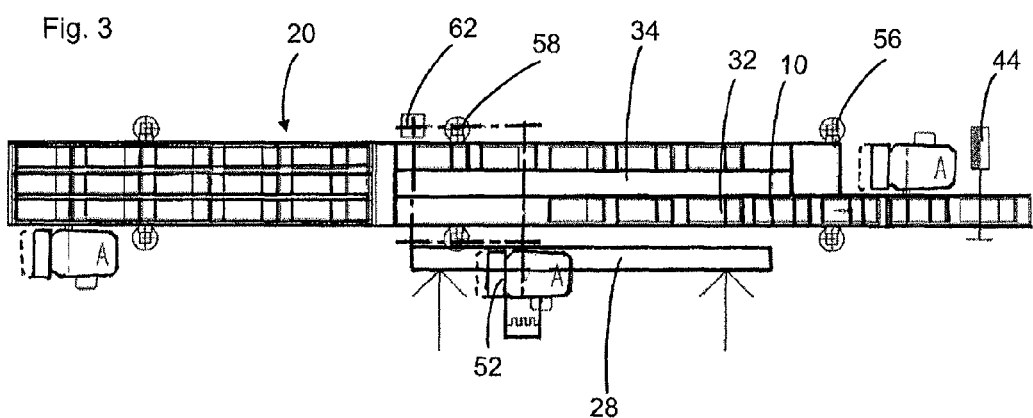
FIG. 3 shows a detailed view of a further embodiment of an assembling device.

FIG. 3 shows a further embodiment of an assembling device 12 according to the invention. The main difference compared to the embodiment shown in FIG. 2 lies in the fact that here just one drive device 52 is provided, but in addition a coupling device 62 is provided which couples one or both of the upper conveyor belts 34 as desired to the movement of the lower conveyor belt 32. After this coupling, the assembled piece goods 10 can also be transported to the left in FIG. 3.

Figure 4:
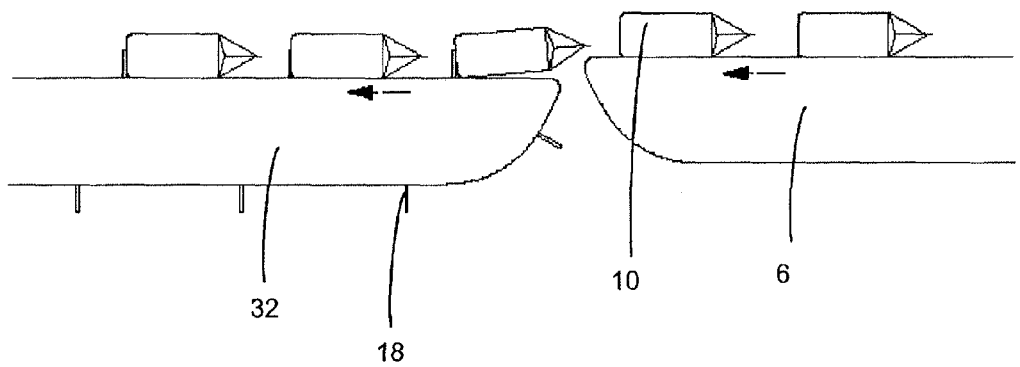
FIG. 4 shows a further detailed view of the apparatus of FIG. 1.

FIG. 4 shows an enlarged view of a transition region between the second transport device 6 and the lower conveyor belt 32 of the assembling device 12. The piece goods 10 are supplied on this second transport device 6 and these two transport devices 6 and 32 are rotated synchronously with one another in such a way that the piece goods 10 are provided at precise distances from one another, said distances being set by spacer devices 18. As soon as a group of six successive piece goods 10 is formed, this group can be transferred from the lower conveyor belt 32 onto the upper conveyor belt 34 to create the piece goods batch 20, with the distances being maintained in the process.

During the displacement of the groups of piece goods transversely to the transport direction R (cf. arrow Q in FIG. 1), the abovementioned lower conveyor belt 32 is at a standstill. Accordingly, the second transport device 6 is preferably also stopped. In these phases, the illustrated buffer device is filled with additional piece goods 10, i.e. the carriage 38 moves to the right in FIG. 1. As soon as piece goods are again transferred to the assembling device 12, the transport device 6 also moves, namely preferably at a higher transport speed than that of the transport device 2. In these phases, the buffer device can be at least partially emptied again, i.e. the carriage 38 is displaced to the left again in FIG. 1 in order in this way to shorten the transport section.

All of the features disclosed in the application documents are claimed as essential to the invention in so far as they are novel individually or in combination with respect to the prior art.

What is claimed is:

1. Apparatus for forming piece goods batches, comprising:
   a first transport device which transports piece goods along a predefined transport path at a first transport speed;
   a second transport device which transports the piece goods along the predefined transport path at a second transport speed, wherein the second transport device is arranged downstream of the first transport device along the transport path;
   an assembling device which is arranged downstream of the second transport device along the transport path, wherein the assembling device forms piece goods batches from a plurality of the piece goods; and
   a buffer device arranged between the first transport device and the second transport device, which transports the piece goods along a variable length buffer section,
   wherein the first transport speed and the second transport speed differ at least at times, wherein the buffer device at least at times collects the piece goods brought about as a result of different speeds, wherein the buffer device is configured to receive a varying number of piece goods as a result of the variable length buffer section, wherein the buffer device comprises a displaceable carriage providing a movement that is periodic in a regular operating mode along the transport path, and wherein in response to displacing the carriage along at least one of a transport section of the first transport device and a transport section of the second transport device, the transport path along which the first transport device, the second transport device, and the buffer device are each positioned, is lengthened or shortened.

2. Apparatus according to claim 1, wherein the first transport speed and the second transport speed differ at least at times in the regular operating mode.

3. Apparatus according to claim 1, wherein the second transport speed is at times greater than the first transport speed and is at times lower than the first transport speed.

4. Apparatus according to claim 1, wherein a further transport device is arranged after the second transport device.

5. Apparatus according to claim 4, wherein the further transport device has spacer devices which produce constant distances between the piece goods.

6. Apparatus according to claim 4, wherein the further transport device comprises a conveyor belt.

7. Apparatus according to claim 1, wherein the assembling device comprises a displacement device which displaces groups of piece goods in a direction differing from a transport direction.

8. Apparatus according to claim 1, wherein the assembling device comprises a displacement device which displaces groups of piece goods in a direction perpendicular to a transport direction of a further transport device that is arranged after the second transport device.

9. Apparatus according to claim 1, wherein the assembling device comprises at least two conveyor belts which can be driven independently of one another.

10. Apparatus according to claim 1 further comprising a distance sensing device which is arranged upstream of the buffer device along the transport path, and which senses distances between the piece goods.

11. Apparatus according to claim 1, wherein the apparatus comprises a position sensing device which is arranged downstream of the buffer device along the transport path and which senses positions of the piece goods.

12. Method for forming piece goods batches, comprising:
transporting piece goods along a predefined transport path at a first transport speed by a first transport device;
transporting the piece goods along the predefined transport path at a second transport speed by a second transport device, said second transport device being arranged downstream of the first transport device along the transport path;
forming piece goods batches from a plurality of the piece goods by an assembling device which is arranged downstream of the second transport device along the transport path;
transporting the piece goods along a variable length buffer section by a buffer device that is arranged between the first transport device and the second transport device,
wherein the first transport speed and the second transport speed differ at least at times, wherein the buffer device comprises a displaceable carriage providing a movement that is periodic in a regular operating mode along the transport path, wherein the buffer device at least at times collects the piece goods brought about as a result of different transport speeds, wherein the buffer device is configured to receive a varying amount of piece goods as a result of the variable length buffer section, and wherein in response to displacing the carriage along at least one of a transport section of the first transport device and a transport section of the second transport device, the transport path along which the first transport device, the second transport device, and the buffer device are each positioned, is lengthened or shortened.

13. Method according to claim 12, wherein a transport movement of the second transport device is stopped at least intermittently.

14. Method according to claim 13 further comprising buffering a plurality of the piece goods at the buffer device as a result of the intermittent stoppage of the second transport device.

15. Method according to claim 14, wherein the buffering the plurality of the piece goods occurs during the regular operating mode.

16. Method according to claim 12 further comprising buffering a plurality of the piece goods at the buffer device as a result of a difference between the first transport speed and the second transport speed.

17. Apparatus according to claim 1, wherein a filling and emptying of the buffer device takes place.

18. Apparatus for forming piece goods batches, comprising:
a first transport device which transports piece goods along a predefined transport path at a first transport speed;
a second transport device which transports the piece goods along the predefined transport path at a second transport speed, wherein the second transport device is arranged downstream of the first transport device along the transport path;
an assembling device which is arranged downstream of the second transport device along the transport path, wherein the assembling device forms piece goods batches from a plurality of the piece goods; and
a buffer device arranged between the first transport device and the second transport device, which transports the piece goods along a variable length buffer section,
wherein the first transport speed and the second transport speed differ at least at times, wherein the buffer device at least at times collects the piece goods brought about as a result of different speeds, wherein the buffer device is configured to receive a varying number of piece goods as a result of the variable length buffer section, wherein the buffer device is displaceable along at least one of a transport section of the first transport device and a transport section of the second transport device, and wherein, in time portions in which the second transport speed is greater than the first transport speed, the buffer device is emptied.

19. Apparatus for forming piece goods batches, comprising:
a first transport device which transports piece goods along a predefined transport path at a first transport speed;
a second transport device which transports the piece goods along the predefined transport path at a second transport speed, wherein the second transport device is arranged downstream of the first transport device along the transport path;
an assembling device which is arranged downstream of the second transport device along the transport path, wherein the assembling device forms piece goods batches from a plurality of the piece goods; and
a buffer device arranged between the first transport device and the second transport device, which transports the piece goods along a variable length buffer section, wherein the first transport speed and the second transport speed differ at least at times, wherein the buffer device at least at times collects the piece goods brought about as a result of different speeds, wherein the buffer device is configured to receive a varying number of piece goods as a result of the variable length buffer section, and wherein the buffer device is displaceable along at least one of a transport section of the first transport device and a transport section of the second transport device that are parallel each other.

* * * * *